(12) United States Patent
Handke et al.

(10) Patent No.: US 7,077,248 B2
(45) Date of Patent: Jul. 18, 2006

(54) SUSPENSION STRUT UNIT WITH A STOP BUFFER

(75) Inventors: Günther Handke, Euerbach (DE); Manfred Schuler, Dittelbrunn (DE); Wolfgang Breun, Niederwerm (DE); Ali Dogan, Schweinfurt (DE); Stephan Zuber, Schonungen (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/785,915

(22) Filed: Feb. 24, 2004

(65) Prior Publication Data
US 2004/0245691 A1 Dec. 9, 2004

(30) Foreign Application Priority Data
Feb. 25, 2003 (DE) ................ 103 08 193

(51) Int. Cl.
*F16F 9/00* (2006.01)
(52) U.S. Cl. ............... 188/321.11; 188/322.12; 267/220; 280/124.147
(58) Field of Classification Search ........... 188/321.11, 188/322.12; 267/220, 33, 219, 179, 221; 280/124.147, 124.155
See application file for complete search history.

(56) References Cited

U.S. PATENT DOCUMENTS

| | | | | |
|---|---|---|---|---|
| 4,274,655 A | * | 6/1981 | Lederman | 280/124.155 |
| 4,531,759 A | | 7/1985 | Rezanka et al. | |
| 4,805,886 A | * | 2/1989 | Hassan | 267/220 |
| 5,308,048 A | * | 5/1994 | Weaver et al. | 267/220 |
| 5,454,585 A | * | 10/1995 | Dronen et al. | 280/124.145 |
| 5,467,971 A | * | 11/1995 | Hurtubise et al. | 267/220 |
| 5,487,535 A | * | 1/1996 | Carter et al. | 267/220 |
| 5,678,808 A | * | 10/1997 | Claude et al. | 267/64.15 |
| 6,267,512 B1 | | 7/2001 | Beghini et al. | |
| 6,592,112 B1 | * | 7/2003 | Bishop et al. | 267/220 |
| 6,736,381 B1 | * | 5/2004 | Chesne | 267/220 |
| 2003/0047897 A1 | | 3/2003 | Hurrlein et al. | |

FOREIGN PATENT DOCUMENTS

| | | |
|---|---|---|
| DE | 83 11 927 | 9/1983 |
| DE | G-83 11 927 | 9/1983 |
| DE | 197 19 301 | 11/1998 |
| DE | 199 23 847 | 12/1999 |
| FR | 2 829 430 | 3/2003 |
| GB | 2 347 905 | 9/2000 |

* cited by examiner

*Primary Examiner*—James McClellan
*Assistant Examiner*—Mariano Sy
(74) *Attorney, Agent, or Firm*—Cohen, Pontani, Lieberman & Pavane

(57) ABSTRACT

Suspension strut unit comprising a connector bearing for piston rod of the suspension strut unit, a spring plate for a vehicle spring, and a first has a bearing with a bearing input part on the spring plate side and a bearing output part on the connector bearing side, which bearing allows relative rotational movement between the vehicle spring and the connector bearing of the piston rod. After the piston rod has traveled inward a certain distance, the cylinder is supported against the connector bearing by way of a stop buffer. A second bearing allows relative rotational movement between the connector bearing and the cylinder when the stop buffer is active; the second bearing is located functionally between the stop buffer and the connector bearing, and a functional separation is present between the bearing input part for the spring plate and the second bearing.

15 Claims, 6 Drawing Sheets

SUSPENSION STRUT UNIT WITH A STOP BUFFER

BACKGROUND OF THE INVENTION

1. Field of the Invention

The invention pertains to a suspension strut including unit a cylinder, a piston rod movable axially in the cylinder, a connector bearing fixed to the piston rod, a spring plate for supporting a vehicle spring, and a stop buffer for supporting the cylinder against the connector bearing to limit axial movement between the cylinder and the connector bearing. A first bearing permits relative rotation between the spring plate and the connector bearing, and a second bearing permits relative rotation between the connector bearing and the cylinder when the stopper buffer supports the connector bearing.

2. Description of the Related Art

A suspension strut unit with a rotatable buffer support is known from DE 83 11 927 U1. In a suspension strut unit, the cylinder turns relative to the buffer when a deflecting movement occurs. In addition to a bearing between a spring plate and a connecting element on the vehicle body side, a second bearing is also used, which compensates for relative movement between the connecting element and the cylinder after the stop buffer has come to rest on the upper end surface of the cylinder. The second bearing is a component of an end cap, which is pressed onto the cylinder. The two bearings make it possible for the connector bearing to be completely disconnected from the cylinder of the suspension strut unit. Thus it is impossible for any twisting which could impair the comfort of the vehicle's occupants to occur between the connector bearing and the cylinder.

Although the end cap itself is relatively simple in design, the goal was to find an alternative.

SUMMARY OF THE INVENTION

According to the invention, the second bearing is located functionally between the stop buffer and the connector bearing, a functional separation being present between the bearing input part for the spring plate and the second bearing.

The great advantage of this variant is that the first bearing for the spring plate and the second bearing for the stop buffer form components which are independent of each other to the extent that the removal of one of the bearings or damage to one of them has no effect on the overall functionality of the other bearing. This means that the first bearing for the spring plate can be set at an angle to the longitudinal axis of the suspension strut unit. If the bearing for the stop buffer were connected to the angled bearing for the spring plate, the stop buffer would wobble around the longitudinal axis of the suspension strut unit when deflections occur. It would then be possible for the stop buffer to make frictional contact with the piston rod.

For cost reasons, it can be effective to design the second bearing as a slide bearing.

So that the force will flow directly, the second bearing is supported on a carrier plate of the connector bearing.

It is also possible for the stop buffer to have a fastening sleeve which connects the stop buffer to the connector bearing. In addition, the fastening sleeve for the second bearing can form the bearing input part. The bearing input part can be made of metal, for example, so that it can absorb large forces and still offer a good contact surface for the second bearing.

There is also the possibility that the fastening sleeve could carry a protective body for the piston rod. The protective body, e.g., a bellows, should not be twisted when the inward travel is great enough to cause the stop buffer to contact the cylinder cap and to execute a deflecting movement at the same time.

Alternatively, a slide element, which carries the protective body for the piston rod, can be located between the bearing input part and the bearing output part of the second bearing.

According to an especially simple solution, the stop buffer includes at least two individual stop buffers arranged in series, which are able to move relative to each other in the circumferential direction. The stop buffer thus forms the bearing input part and the slide element. In addition, it is also possible to create a modular system, according to which multiple individual stop buffers are stacked together. Customized stop buffers could therefore be assembled to suit different sets of requirements in various types of vehicles.

The fastening sleeve for the stop buffer can also form the slide element for the second bearing. The fastening sleeve is clamped axially between the connector bearing and the stop buffer.

It is also possible for the second bearing to be designed as a roller bearing.

So that assembly can be carried out independently of the shock absorber, the second bearing is located in a housing, which is connected to the connector bearing.

To simplify the assembly work, the housing has latching means, which enter into a latching connection with opposing latching means on the connector bearing. By visual inspection of the latched connection, it is possible to determine during the course of the assembly work whether or not the second bearing is in the correct position.

According to an advantageous subclaim, the housing and the stop buffer together form a retaining connection. The housing, like the stop buffer, can be made of plastic. A latching connection can thus be realized as a retaining connection at low cost.

So that the connector bearing can handle especially heavy loads, it can have a third bearing, which holds the piston rod in such a way that it can rotate relative to the connector bearing. Thus all of the components of the shock absorber are able to rotate freely with respect to the connector bearing, so that it is impossible for any twisting to occur between the cylinder or the piston rod and the connector bearing.

To prolong the life of the third bearing for the piston rod, it is advisable for this bearing to be designed so that, with respect to the connector bearing, it is functionally separate from the second bearing. As a result, the support forces of the stop buffer are not transmitted to the connector bearing via the bearing for the piston rod.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
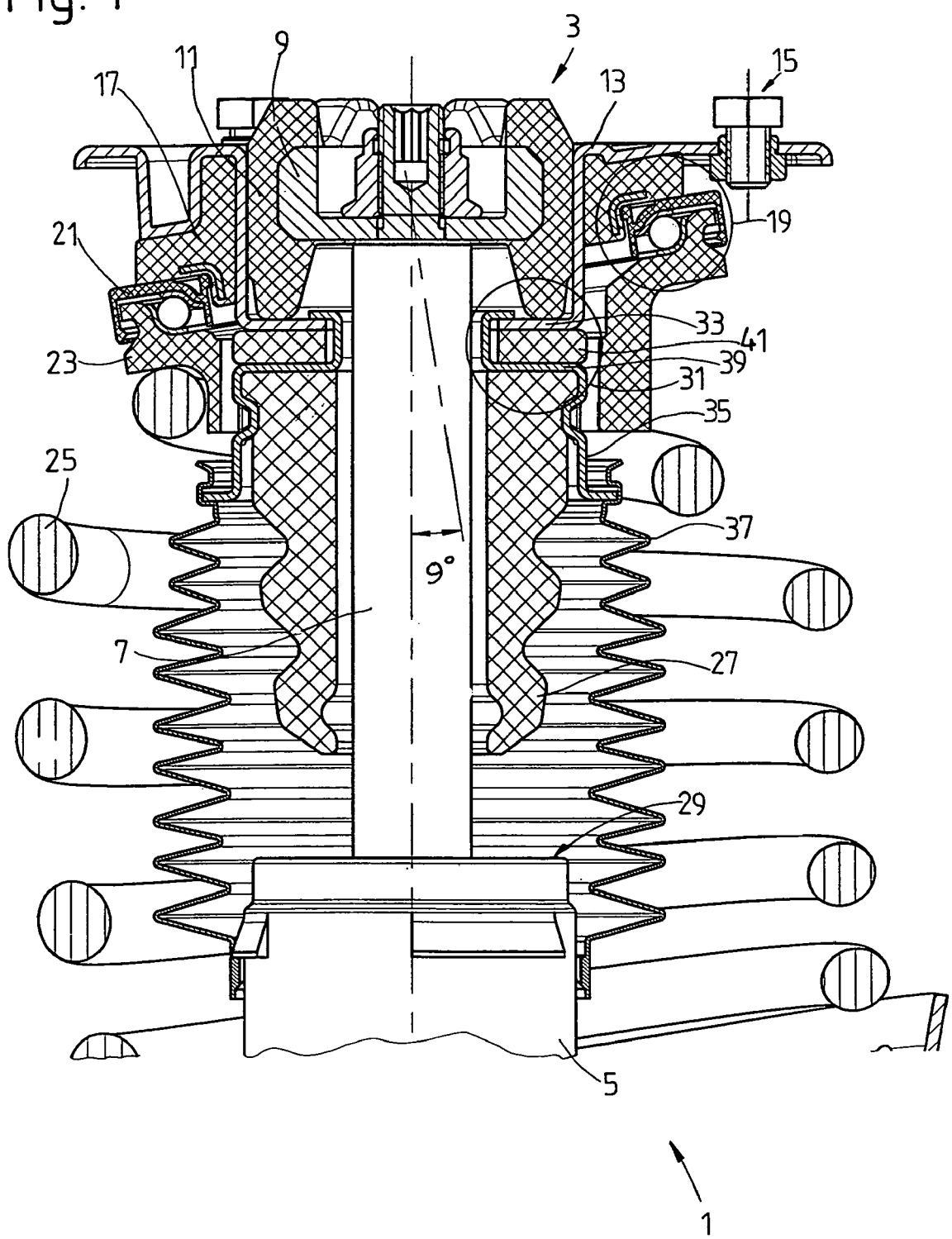
FIGS. 1–4 show four respective embodiments of a suspension strut unit with a connector bearing according to the invention with a slide bearing between the stop buffer and the connector bearing.

FIG. 1 shows a part of a suspension strut unit 1 together with its connector bearing 3. The suspension strut unit comprises a cylinder 5, in which a piston rod 7 moves freely back and forth in the axial direction. The connector bearing has a ring-shaped base body 9 on the piston rod side, this body being enclosed on both axial sides and also radially on all sides by an elastomeric body 11. A cup-shaped carrier body 13 provides reinforcement for the connector bearing and creates a chamber for the elastomeric body with a wall on one axial side and a wall radially around the outside. In addition, the carrier body has connecting means 15, so that it can be attached to the body of the vehicle (not shown).

A second elastomeric body 17, also provided with reinforcement, is supported on the outside of the carrier body 13. The second elastomeric body carries a first bearing 19, which is at an angle to the longitudinal axis of the suspension strut unit, where a bearing output part 21 is supported on the second elastomeric body, and a spring plate 23 for the vehicle spring 25 forms a bearing input part. This first bearing ensures that the vehicle spring can rotate in the circumferential direction relative to the connector bearing and thus also to the piston rod.

Concentric to the piston rod, a stop buffer 27 is fastened to the connector bearing 3. After the piston rod has traveled inward a certain distance relative to the cylinder, the stop buffer 27 comes to rest against one end surface 29 of the cylinder, or, in this case, against the end surface of a cylinder cap. When an inward-travel movement and a deflection movement are superimposed on each other—a situation in which the cylinder rotates relative to the connector bearing—, it would be possible for twisting to occur between the cylinder 5 and the connector bearing 3 as a result of a friction-locking connection between the end surface 29 and the stop buffer. Twisting of this type is prevented by installing a second bearing 31 in such a way that it is functionally between the stop buffer 27 and the connector bearing 3. The second bearing is designed here as a slide bearing. The slide bearing is supported on a carrier plate 33, which is also part of the carrier body 13 and which extends at a right angle to the longitudinal axis of the suspension strut unit. The carrier plate 33 forms the bearing output part for the second bearing 31, and a fastening sleeve 35, which carries the stop buffer by means of pleats extending at least partially around the circumference of the sleeve, forms the bearing input part. The fastening sleeve 35 also carries a protective body in the form of bellows 37 for the piston rod. Between a shoulder surface 39, also horizontal, of the fastening sleeve and the support plate 33, there is a ring-shaped slide element 41. The top end of the fastening sleeve 35 extends into the cup-shaped carrier body 13 and is bent over onto it at least in certain areas, so that the second bearing 31 cannot fall apart in the axial direction.

When the stop buffer comes to rest against the end surface 29, the first bearing 19 and the second bearing 31 can move in complete independence of each other, because there are no connections of any kind between the bearing input parts of the two bearings. For this reason, it is impossible for the stop buffer 27 to wobble, which would happen if it were carried on the spring plate, which supports the first bearing 19 at an angle.

Figure 2:
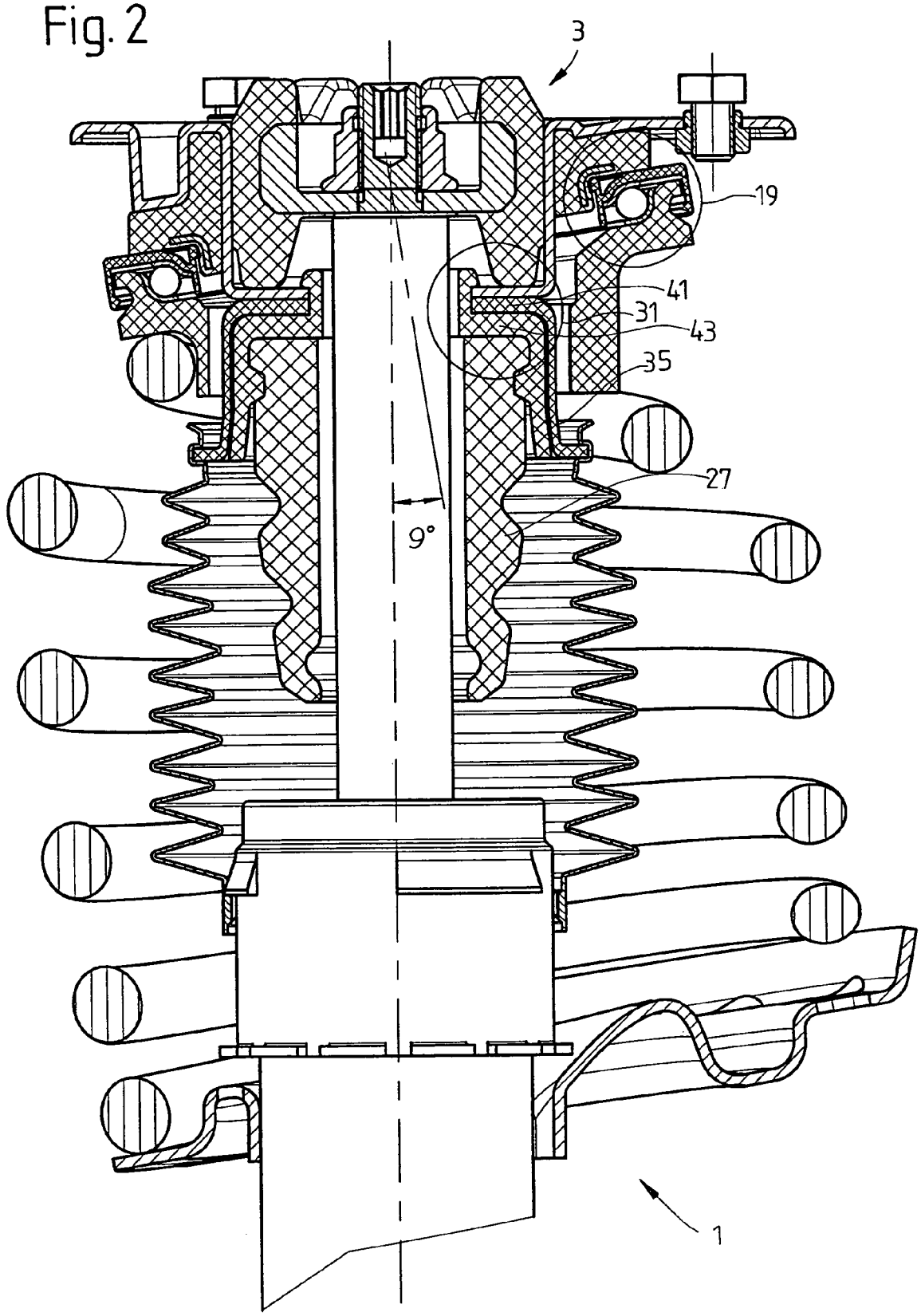

FIG. 2 shows a connector bearing 3 identical to that of FIG. 1, except that the slide body 41 is formed here by the fastening sleeve 35. To secure the second bearing 31 in the axial direction, a bearing input part 43 is used, which also carries the stop buffer 27. The bearing input part 43 should preferably be made of plastic.

Figure 3:
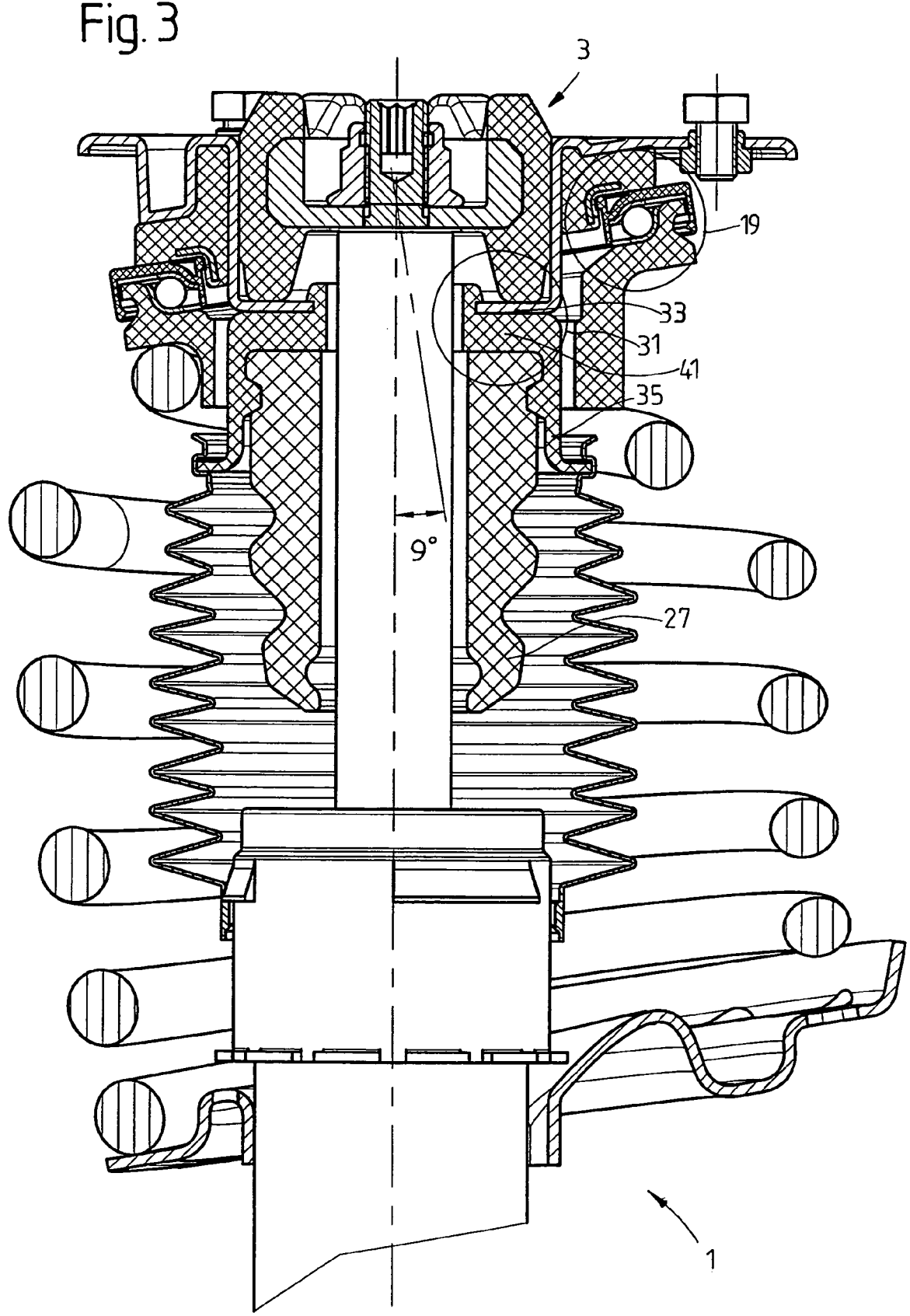

FIG. 3 shows a design which is even simpler than that of FIG. 2, in which the fastening sleeve 35 carries the stop buffer 27 and also forms the slide body 41, which also serves as the bearing input part. In practice, the second bearing 31 thus consists of only two parts, namely, the carrier plate 33 of the connector bearing 3 and the fastening sleeve 35, where again there is no connection between the bearing input part of the first bearing 19 and the bearing input part of the second bearing 31.

Figure 4:
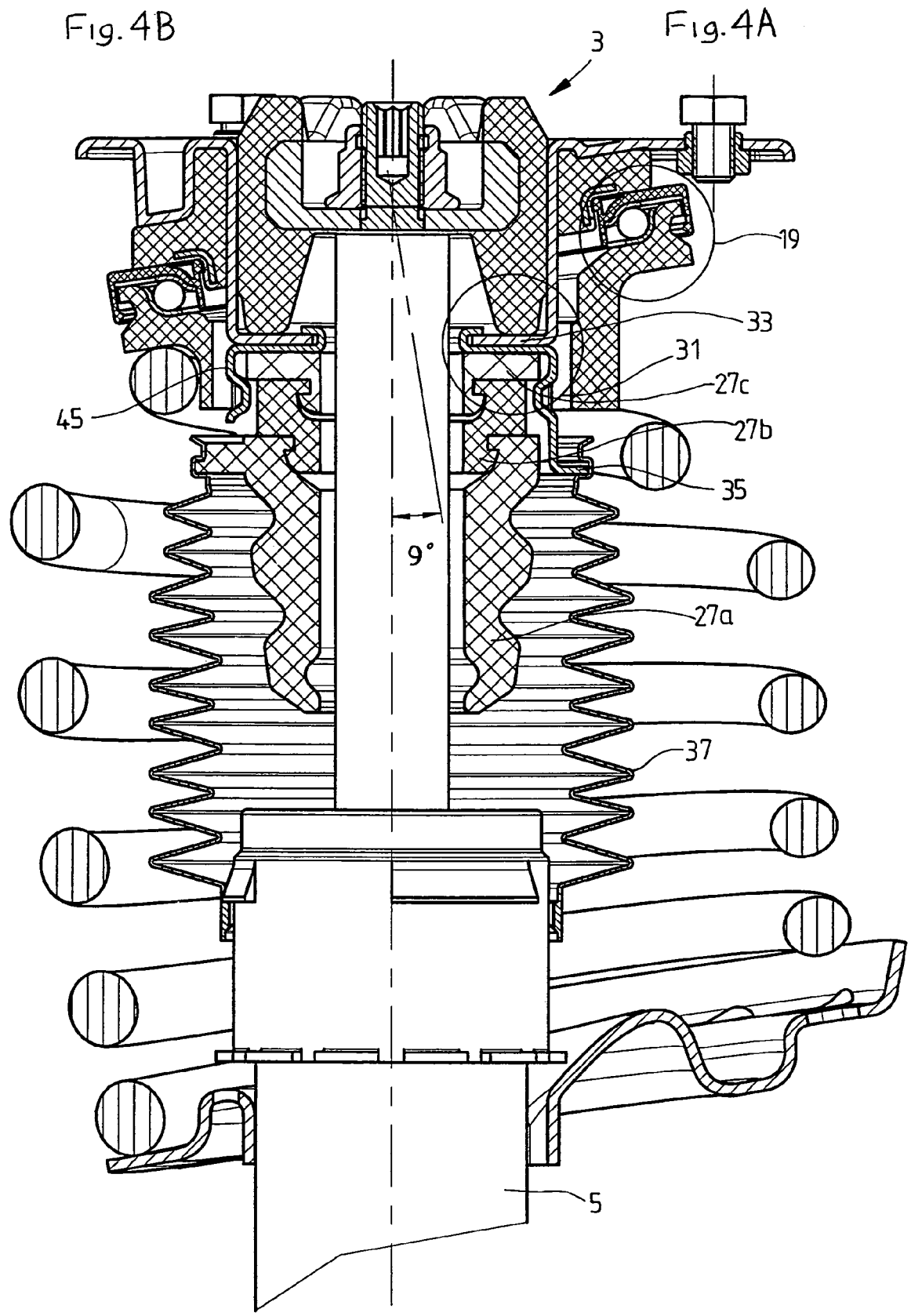

FIGS. 4A and 4B show two design variants of the second bearing 31. Common to both variants of the second bearing 31 is that it includes three individual stop buffers 27a, 27b, 27c, arranged in series, which are able to move relative to each other in the circumferential direction.

In the embodiment of FIG. 4A, the bellows 37 is held by the fastening sleeve 35, which again carries the individual stop buffer 27c axially with respect to the carrier plate 33 by means of at least one partial pleat. There is a snap-together connection between the individual stop buffers 27a, 27b, 27c, so that, in a concrete case, additional elements can be used to adapt the stop buffer to the specific requirements.

In FIG. 4B, the bellows 37 is held directly by the stop buffer 27a. A clamp 45, which copies the principle shown on the right side of the diagram, holds the third individual stop buffer 27c. The advantage of this variant is that, when the stop buffer 27a is in contact with the end surface 29 and simultaneously the cylinder is rotating relative to the connector bearing, it is impossible for the bellows 37 to be subjected to torsion, because the individual stop buffer 27a, the cylinder, and the protective body form a closed path for the flow of force in the circumferential direction, and thus no relative movement can occur between them.

Figure 5:
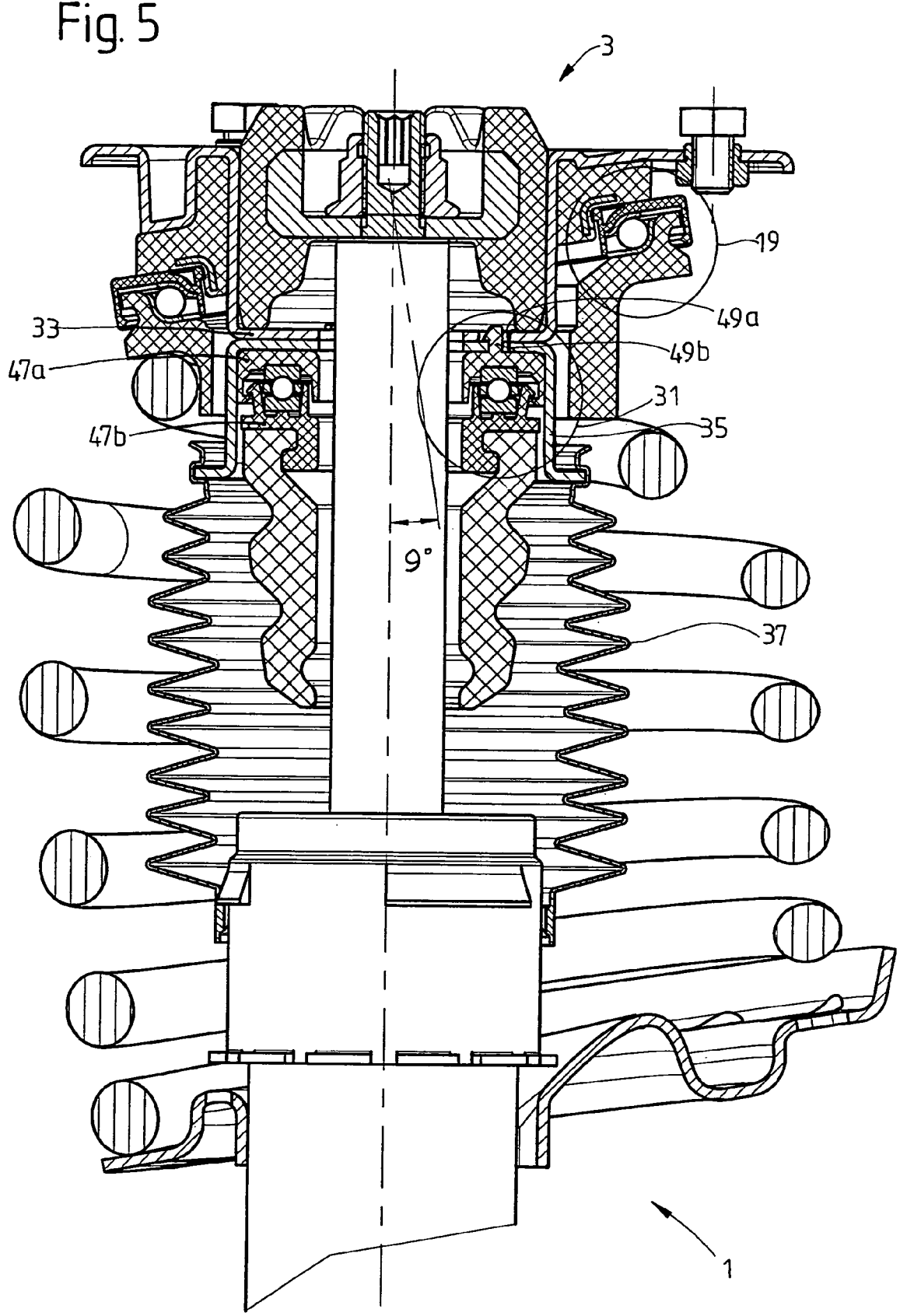
FIGS. 5 and 6 show a suspension strut unit with a connector bearing according to the invention with a roller bearing between the stop buffer and the connector bearing.

In contrast to the previously described variants, a roller bearing is used in FIG. 5 as the second bearing 31. The roller bearing 31 comprises a horizontally split housing parts 47a and 47b, which can rotate relative to each other, where a connection-side housing part 47a enters into a latching connection with a through-hole serving as opposing latching means 49a in the carrier plate 33 of the connector bearing 3, for which purpose the housing part 47a has finger-like latching means 49b. The fastening sleeve 35 for the bellows 37 is clamped between the housing part 47a and the carrier plate 33.

The lower housing part 47b and the stop buffer 27 together form a retaining connection. The housing parts 47a, 47b are also connected positively to each other in the axial direction. During assembly, the closed housing and the stop buffer 27 can be introduced together into the fastening sleeve 35. The upper housing part 47a centers itself radially in the fastening sleeve. This structural unit can then be clamped to the carrier plate 33.

A roller bearing as support for the stop buffer 27 is more expensive than a slide bearing, but it operates with less friction.

Figure 6:
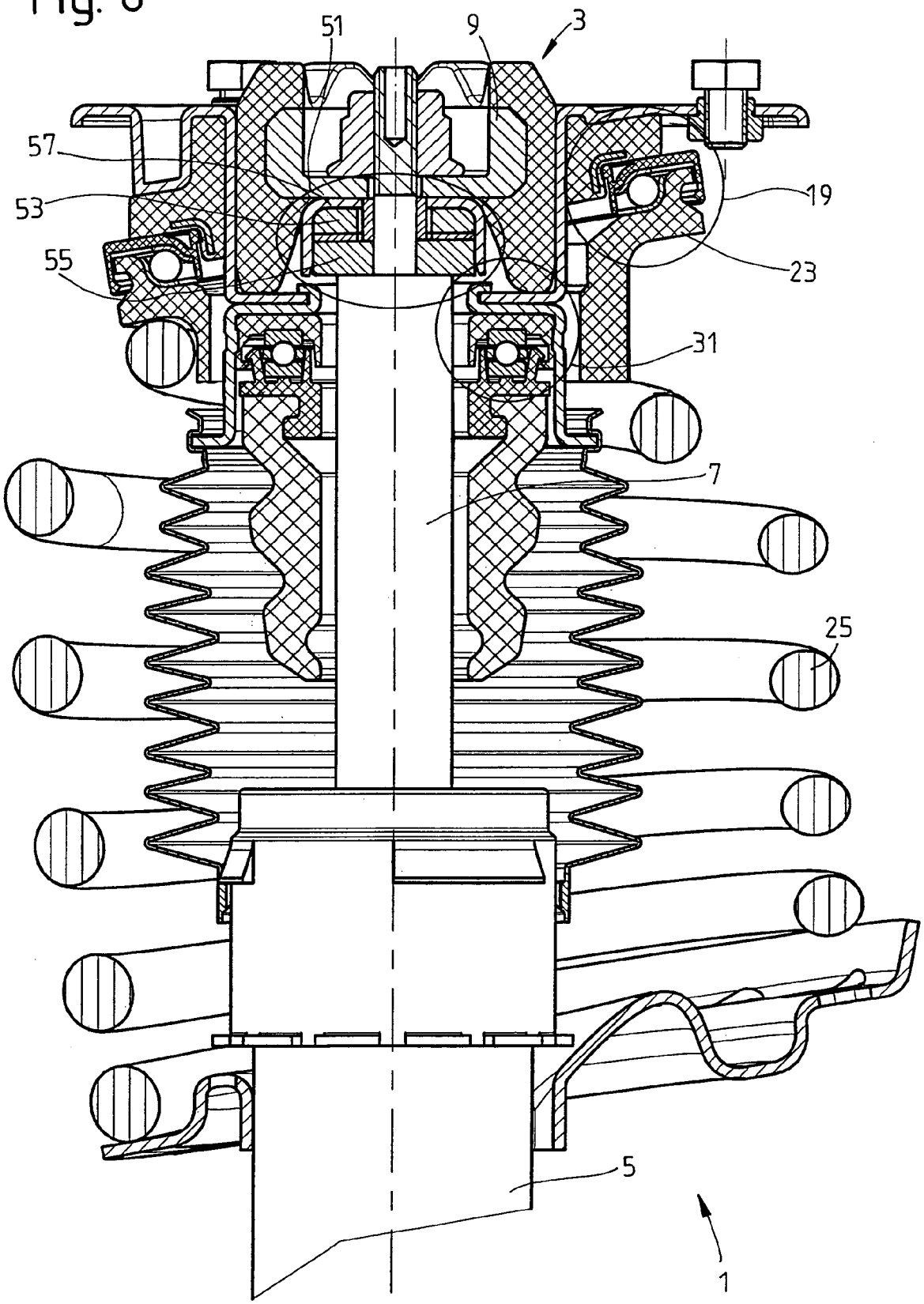

In FIG. 6, a third bearing 51 is used in addition to the first bearing 19 for the vehicle spring 25 and the second bearing 31 for the stop buffer 27. This third bearing allows the piston rod 7 to rotate relative to the connector bearing 3. The third bearing 51 is located spatially between the ring-shaped base body 9 and a shoulder of the piston rod and thus is designed to be functionally separate from the second bearing 31, because neither the bearing input part nor the bearing output part of the second bearing is connected to the piston rod or to the base body 9.

The third bearing is also designed here, by way of example, as a slide bearing. A slide body 53 is located between a bearing disk 55 and a bearing cup 57. As an alternative, a roller bearing could also be used at this point.

All of the variants guarantee that, even when the first bearing 19 for the spring plate 23 is set at an angle, the stop buffer 27 cannot wobble when the cylinder 5 rotates relative to the connector bearing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension strut unit comprising:
   a cylinder;
   a piston rod movable axially in said cylinder;
   a connector bearing fixed to said piston rod;
   a spring plate for supporting a vehicle spring;
   a stop buffer for supporting the cylinder against the connector bearing to limit axial movement between the cylinder and the connector bearing;
   a first bearing which permits relative rotation between said spring plate and said connector bearing; and
   a second bearing which permits relative rotation between the connector bearing and the cylinder when the stop buffer supports the connector bearing, the second bearing including a bearing input part connected to the stop buffer and being located between the stop buffer and the connector bearing, a connection between the second bearing and the connector bearing being separated from a connection between the spring plate and the connector bearing.

2. A suspension strut unit as in claim 1 wherein said second bearing is a slide bearing.

3. A suspension strut as in claim 1 wherein said connector bearing comprises a support plate, said second bearing being supported on said support plate.

4. A suspension strut as in claim 1 further comprising a fastening sleeve which carries said stop buffer and connects said stop buffer to said connector bearing.

5. A suspension strut unit as in claim 4 wherein said fastening sleeve forms the bearing input part of said second bearing.

6. A suspension strut unit as in claim 5 further comprising a protective body for said piston rod, said fastening sleeve carrying said protective body.

7. A suspension strut unit as in claim 5 further comprising a protective body for said piston rod, said second bearing further comprising a slide body, said slide body carrying said protective body.

8. A suspension strut unit as in claim 1 wherein said stop buffer comprises at least two buffer parts which are arranged in axial series and can rotate relative to each other.

9. A suspension strut unit as in claim 4 wherein said fastening sleeve forms a slide body of said second bearing.

10. A suspension strut unit as in claim 1 wherein said second bearing is a roller bearing.

11. A suspension strut unit as in claim 10 further comprising a housing connected to said connector bearing, said second bearing being in said housing.

12. A suspension strut unit as in claim 11 wherein said housing is latched to said connector bearing.

13. A suspension strut unit as in claim 11 wherein the housing retains the stop buffer.

14. A suspension strut unit as in claim 1 further comprising a third bearing which permits relative rotation between said piston rod and said connector bearing.

15. A suspension strut as in claim 14 wherein said third bearing is separated from the second bearing relative to the connector bearing.

* * * * *